US012645026B2

(12) United States Patent
Broughton et al.

(10) Patent No.: US 12,645,026 B2
(45) Date of Patent: Jun. 2, 2026

(54) COMPACT CABLE ASSEMBLY

(71) Applicant: CommScope Technologies LLC,
Hickory, NC (US)

(72) Inventors: Adam Verne Broughton, Harrisburg,
PA (US); David Donald Erdman,
Hummelstown, PA (US); **Josiah D.
Kadar-Kallen**, Harrisburg, PA (US);
Michael Aaron Kadar-Kallen,
Harrisburg, PA (US)

(73) Assignee: **COMMSCOPE TECHNOLOGIES
LLC**, Claremont, NC (US)

( * ) Notice: Subject to any disclaimer, the term of this
patent is extended or adjusted under 35
U.S.C. 154(b) by 390 days.

(21) Appl. No.: 18/308,801

(22) Filed: Apr. 28, 2023

(65) Prior Publication Data

US 2023/0266522 A1 Aug. 24, 2023

Related U.S. Application Data

(63) Continuation of application No.
PCT/US2021/057355, filed on Oct. 29, 2021.

(Continued)

(51) Int. Cl.
G02B 6/02 (2006.01)
G02B 6/36 (2006.01)
G02B 6/38 (2006.01)

(52) U.S. Cl.
CPC ....... G02B 6/02042 (2013.01); G02B 6/3676
(2013.01); G02B 6/3826 (2013.01)

(58) Field of Classification Search
None
See application file for complete search history.

(56) References Cited

U.S. PATENT DOCUMENTS 5,487,261 A * 1/1996 Varga ................... G02B 6/4491
57/352
5,689,598 A * 11/1997 Dean, Jr. ................ G02B 6/389
385/71

(Continued)

FOREIGN PATENT DOCUMENTS

JP 2008-249824 A 10/2008
WO 2016/100384 A1 6/2016

(Continued)

OTHER PUBLICATIONS

Machine English translation of JP 2008-249824 A.*
International Search Report and Written Opinion for Application
No. PCT/US2021/057355 mailed Feb. 24, 2022.

*Primary Examiner* — Thomas A Hollweg
(74) *Attorney, Agent, or Firm* — Merchant & Gould P.C.

(57) ABSTRACT

Optical fibers of a multi-fiber cable are grouped into con-
nection units. The distal ends of the fibers of each connection
unit are terminated at a connection unit body that attaches to
a tapering cable core formed of longer ones of the connec-
tion units. After deployment of the cable, two or more
connection units can be stacked together to form a connector
or inserted into a connector shell. Prior to deployment of the
cable, at least some of the connection units are spaced from
each other along the cable. For example, individual connec-
tion units may be disposed at one end of the tapering cable
core and stacks of connection units may be disposed at the
other end of the tapering cable core.

14 Claims, 18 Drawing Sheets

Related U.S. Application Data

(60) Provisional application No. 63/107,850, filed on Oct. 30, 2020.

(56) References Cited

U.S. PATENT DOCUMENTS

| | | | | |
|---|---|---|---|---|
| 7,136,555 | B2 * | 11/2006 | Theuerkorn | G02B 6/4461 |
| | | | | 385/100 |
| 7,277,614 | B2 * | 10/2007 | Cody | G02B 6/3807 |
| | | | | 385/100 |
| 8,565,571 | B2 * | 10/2013 | Kimbrell | G02B 6/545 |
| | | | | 385/135 |
| 8,582,938 | B2 * | 11/2013 | Cody | G02B 6/4472 |
| | | | | 385/100 |
| 8,761,559 | B1 * | 6/2014 | Cody | G02B 6/4403 |
| | | | | 385/100 |
| 8,801,296 | B2 * | 8/2014 | LeBlanc | G02B 6/403 |
| | | | | 385/54 |
| 8,879,883 | B2 * | 11/2014 | Parikh | G02B 6/4444 |
| | | | | 385/138 |
| 9,176,292 | B2 * | 11/2015 | Cody | G02B 6/44384 |
| 9,494,764 | B2 * | 11/2016 | Cody | G02B 6/44384 |
| 9,575,272 | B2 | 2/2017 | Ott | |
| 10,234,634 | B2 * | 3/2019 | Wang | G02B 6/4416 |
| 10,371,917 | B2 * | 8/2019 | Cooke | G02B 6/441 |
| 10,437,003 | B2 * | 10/2019 | Jensen | G02B 6/4475 |
| 10,712,519 | B2 * | 7/2020 | Faulkner | G02B 6/44715 |
| 10,928,592 | B2 * | 2/2021 | Petersen | G02B 6/44715 |
| 12,019,302 | B2 * | 6/2024 | Leeson | G02B 6/50 |
| 2005/0265672 | A1 | 12/2005 | Theuerkorn et al. | |
| 2006/0133759 | A1 | 6/2006 | Mullaney et al. | |
| 2007/0263964 | A1 * | 11/2007 | Cody | G02B 6/2558 |
| | | | | 385/100 |
| 2010/0150504 | A1 | 6/2010 | Allen et al. | |
| 2013/0251319 | A1 | 9/2013 | Compton et al. | |
| 2018/0284382 | A1 * | 10/2018 | Cooke | G02B 6/441 |
| 2018/0329155 | A1 | 11/2018 | Verheyden | |
| 2019/0049685 | A1 * | 2/2019 | Jensen | G02B 6/4475 |
| 2020/0033535 | A1 * | 1/2020 | Petersen | G02B 6/2558 |
| 2022/0357542 | A1 * | 11/2022 | Cooke | G02B 6/443 |

FOREIGN PATENT DOCUMENTS

| | | | |
|---|---|---|---|
| WO | 2017/081306 | A1 | 5/2017 |
| WO | 2019/079326 | A1 | 4/2019 |
| WO | 2020/046709 | A1 | 3/2020 |
| WO | 2021/163063 | A1 | 8/2021 |
| WO | 2022/094286 | A1 | 5/2022 |

* cited by examiner

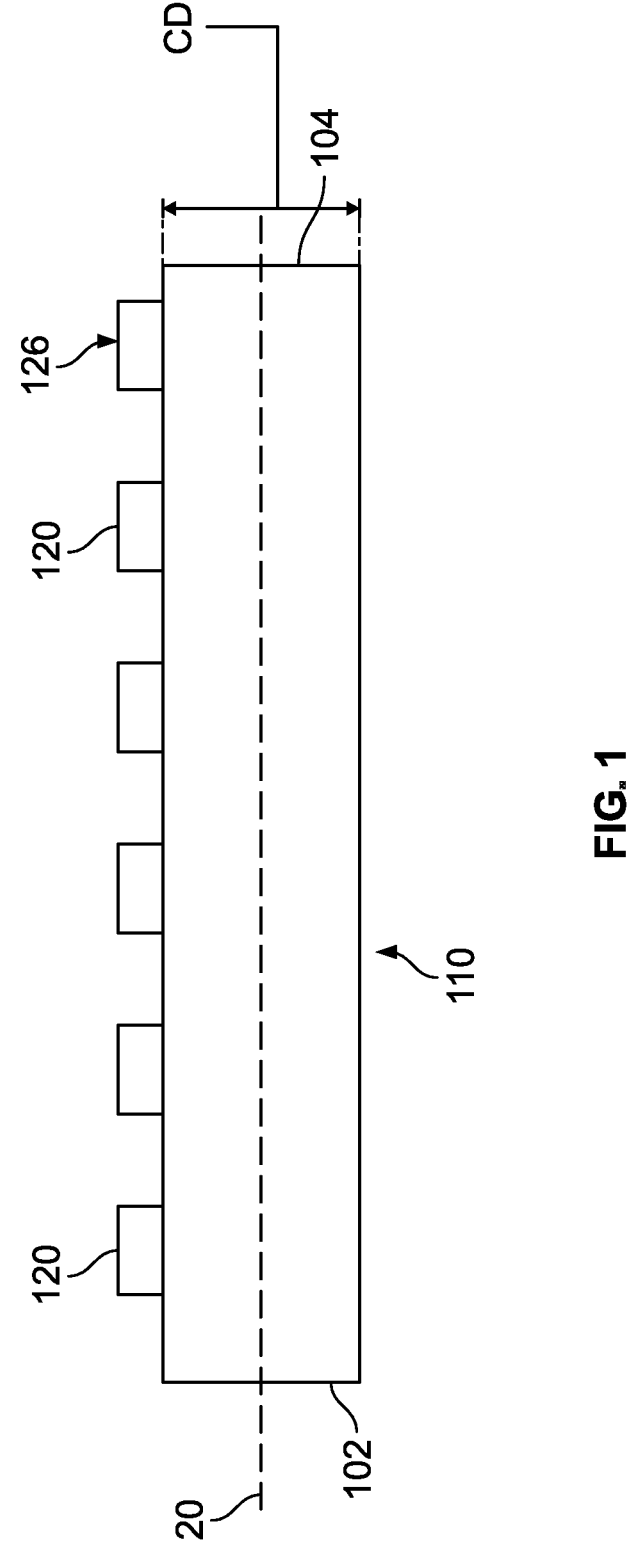
FIG. 1

120,220,420,
520,620

720

700

C2

120,220,420,
520,620

44

C1

812

832

822

826

825

820

40

1124

1112

1126

1320

1382

1380

1382

1320

1380

COMPACT CABLE ASSEMBLY

CROSS-REFERENCE TO RELATED APPLICATION

This application is a Continuation of International Patent Application No. PCT/US2021/057355, filed on Oct. 29, 2021, which claims the benefit of U.S. Patent Application Ser. No. 63/107,850, filed on Oct. 30, 2020, the disclosures of which are incorporated herein by reference in their entireties. To the extent appropriate, a claim of priority is made to each of the above disclosed applications.

TECHNICAL FIELD

The present disclosure relates generally to cable assemblies. Specifically this disclosure relates to a compact cable assembly featuring pre-terminated connectors.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. In some instances, the telecommunications cables are required to enter through a narrow areas such as inner-ducts of buildings. Telecommunications cables tend to fill the space within the inner ducts.

SUMMARY

In some examples the present disclosure relates to a cable assembly, the cable assembly includes a cable which extends along a cable axis between a first and a second end. The cable includes a core which contains a plurality of fibers. The cable also includes a connectorization arrangement. The connectorization arrangement includes a plurality of connection units. The connection units are removably mounted about the core of the cable. Each of the connection units includes a group of the plurality of optical fibers which have been terminated within the connector.

In some examples, the core defines a cross-dimension. In some examples, the cross-dimension changes as the cable extends from the first end to the second end. In some examples, the cross-dimension is directly related to how many of the plurality of fibers are inside of the core.

In some examples, the connection units are stacked on one another and mounted to the core. In some examples the amount of connection units stacked upon one another is inversely related to the amount of optical fibers in the core.

In some examples, the connection units are axially spaced along the cable axis. In some examples, the connection units are circumferentially spaced about the core. In still other examples, the connection units are axially spaced along the cable axis and circumferentially spaced about the core. In other examples the connection units are helically spaced about the core.

In other examples, the connection units are configured to be fit onto a track which is mounted to the core.

In some examples there is a protective jacket around the connection units. The protective jacket can be helically wrapped about the cable axis.

In some aspects the present disclosure relates to a cable assembly. Telecommunications cables can include a core, the core including a plurality of optical fibers and a jacket for protecting the optical fibers. In some examples, telecommunications cables sometimes require connectors. The connectors, in some cases, need to be routed through the same narrow passages which the cables are routed through. Because of this a more compact cable assembly is desired.

BRIEF DESCRIPTION OF THE DRAWINGS

FIG. 1 is a schematic diagram of a cable assembly in accordance with the principles of this disclosure with a plurality of connector units;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Certain aspects of the present disclosure relate to systems, methods, and cable configurations for enhancing a telecommunications cable. In certain examples, this disclosure relates more specifically to fiber optic cables and cable assemblies including a core formed of one or more connection units. In certain implementations, the connection units may have staggered lengths so that some terminate before others. In certain implementations, longer connection units form the core about which shorter connection units may be wound. In some examples, the connection units are configured to fit within a sleeve to help protect the connection units and the core.

Each connection unit includes a group of one or more of the optical fibers of the cable commonly held at a connection unit body. Each connection unit body is configured to terminate the optical fibers of the group. Each connection unit body may maintain the optical fibers of the group in a sequence (e.g., in one or more rows). In some implementations, each connection unit body is not configured to be attached at a port by itself. For example, the connection unit body may lack a latch arrangement with which to attach the connection unit body to a port. In certain implementations, multiple ones of the connection units can be assembled together and the respective connection unit bodies can be mounted within a shell (e.g., a plug housing). In certain examples, the shell is configured to attach to a port (e.g., includes a latch arrangement or other securement structure).

However, in certain implementations, the shell is too large (either alone or in combination with the core) to fit through a conduit used to deploy the cable. In certain implementations, a stack of the connection unit bodies, which may form a connector even absent a shell, cannot fit through the conduit (either alone or in combination with the core). Accordingly, the cable is configured to be deployed through the conduit with the connection unit bodies not assembled (e.g., not within a shell and/or not stacked). Instead, the cable is configured to be deployed while the connection units are separated from each other. For example, each connection unit may be wound or otherwise routed along the cable. By separating the connection units (e.g., spacing the plurality of optical connection units about the core of the fiber optic cable), the cable can be slid through a small area, such as an inner-duct of a building. The connection units can be assembled within shells to form connectors after the cable has been deployed.

Figure 1A:
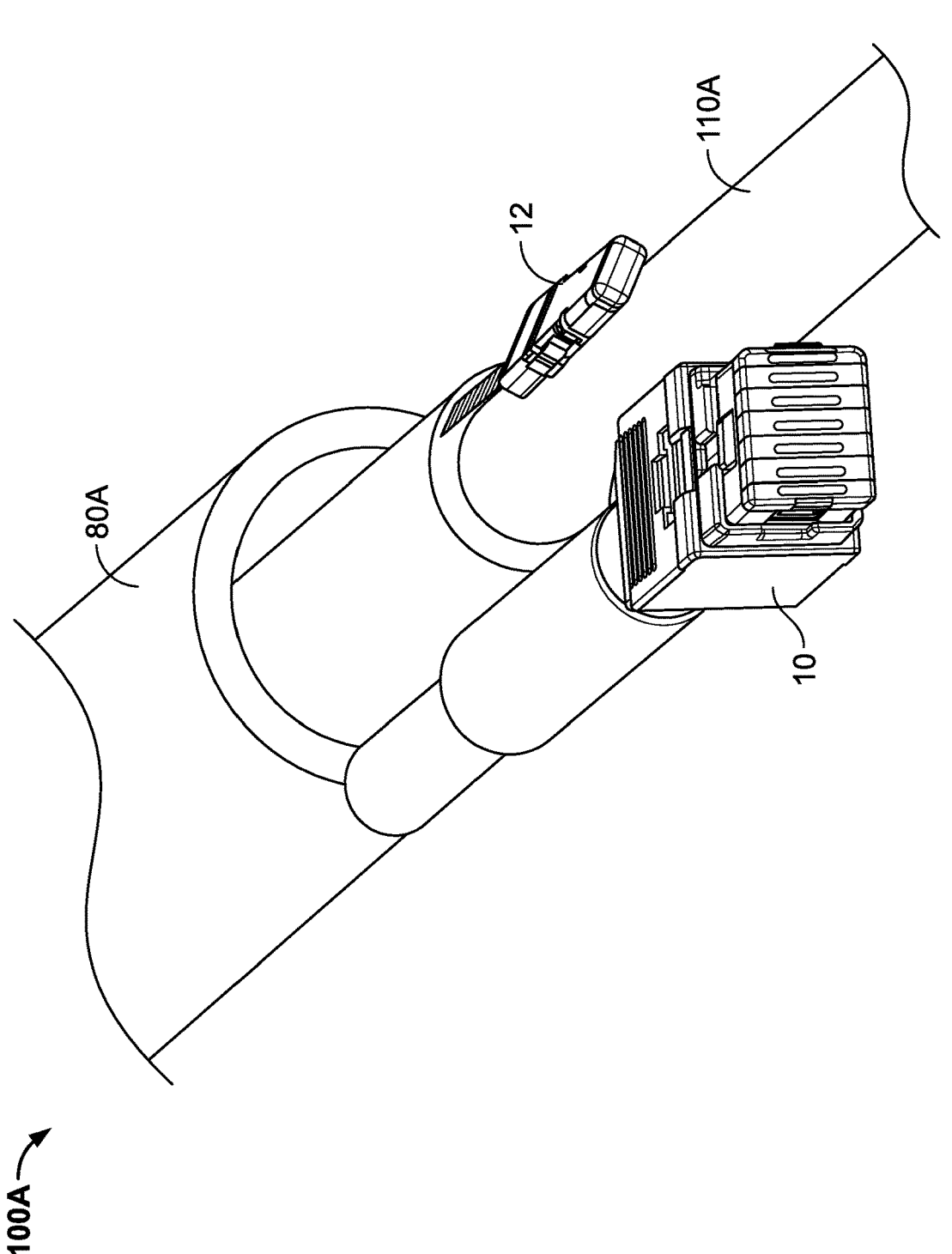
FIG. 1A is a diagram of a cable assembly including a large form factor connector and a connection unit.

Referring to FIG. 1A, a fiber optic cable assembly 100A is shown. The fiber optic cable assembly 100A is shown including a large form factor connector 10 holding a plurality of connection units and a connection unit 12 disposed separate from the connector 10. The fiber optic cable assembly 100A includes a core 110A. The core 110A may be formed of other connection units (e.g., longer connection units). Additionally shown is a conduit 80A through which the fiber optic cable assembly 100A is to be routed during deployment. As can be seen in the Figure, the large form factor connector 10 is too large to fit within the conduit 80A. In some examples, a cross-dimension (e.g., width) of the connector 10 is larger than an inner cross-dimension (e.g., diameter) of the conduit 80A. In other examples, the cross-dimension of the connector 10 combined with a cross-dimension of the core 110A is larger than an inner cross-dimension of the conduit 80A. Accordingly, an assembled connector 10 inhibits routing the fiber optic cable assembly 100A through the conduit 80A or other narrow space. However, the connection unit 12 is compact enough to fit within the form factor (e.g., outer boundary, shape or footprint) defined by the conduit 80A even when combined with a remainder of the cable core 110A. If a larger form factor connector than the connection unit 12 is desired later on, a plurality of the connection units 12 can be assembled to fit with one another and form a large form factor connector, discussed later in greater detail.

Referring to FIG. 1, a schematic view of a fiber optic cable assembly 100, in accordance with the principles of this disclosure, is shown. The fiber optic cable assembly 100 is shown extending between a first end 102 and a second end 104 along a cable axis 20. The fiber optic cable assembly 100 includes a core 110, which extends along the cable axis 20 between the first end 102 and the second end 104 of the fiber optic cable assembly 100. The core 110 has a cross-dimension CD which can be a diameter of the core 110. The cable additionally includes a connectorization assembly 126. The connectorization assembly 126 includes plurality of connection units 120 mounted about the core 110. The connection units 120 are axially spaced along the core 110 and aligned parallel to the cable axis 20.

The core 110 includes a plurality of optical fibers. Each of the connection units 120 includes a group of the plurality of optical fibers which have been preterminated within bodies of the connection unit 120.

Figure 2:
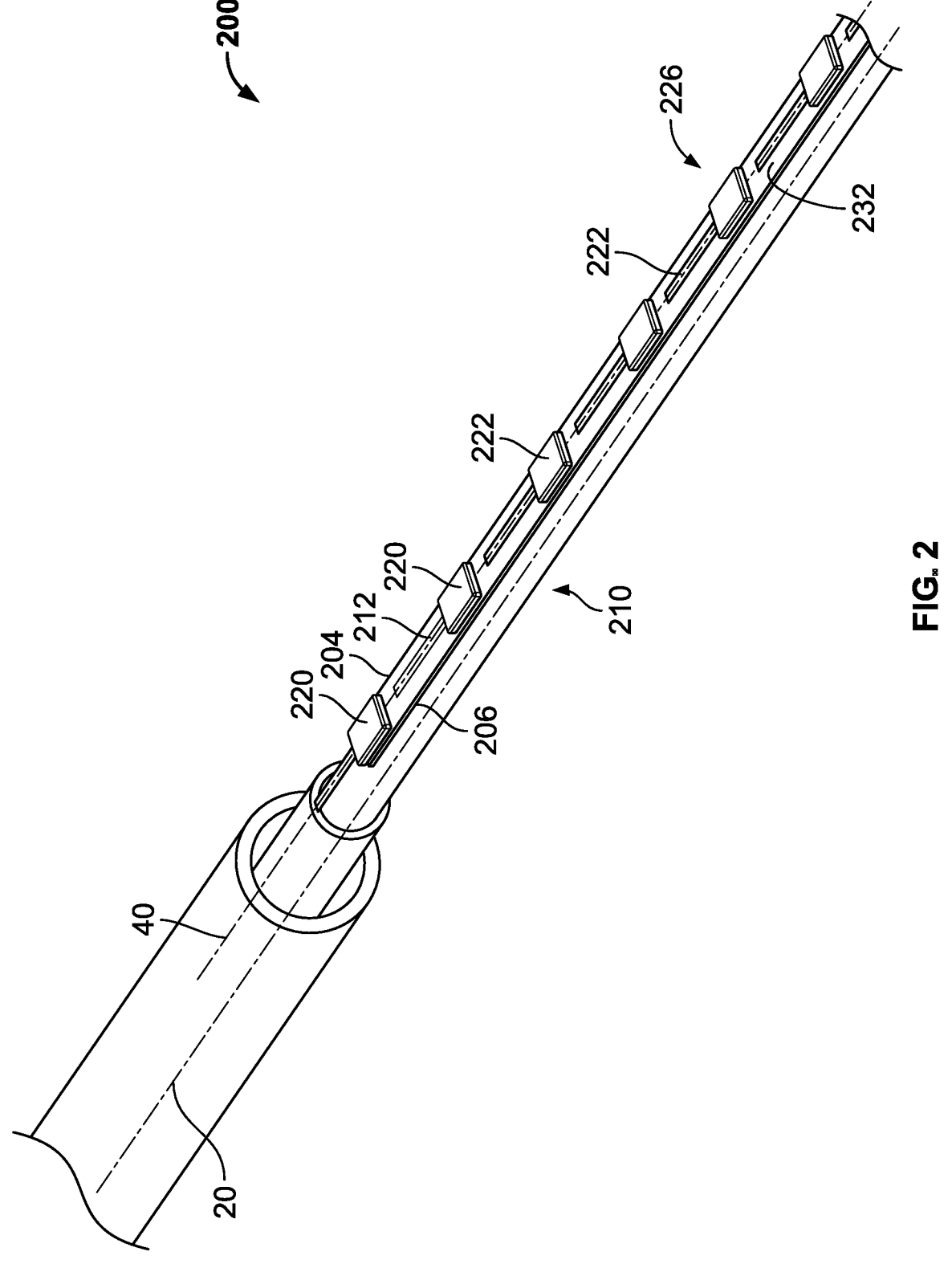
FIG. 2 is a cable assembly in accordance with the principles of this disclosure with a plurality of connector units axially spaced along a track.

Referring to FIG. 2, a different embodiment of a fiber optic cable assembly 200 in accordance with the principles of the present disclosure is shown. The fiber optic cable assembly 200 includes one or more connectorization assemblies 226. The connectorization assembly 226 shown in FIG. 2 includes a track 232 that extends along a track axis 40. Connection units 220 are axially spaced along the track axis 40 of the track 232. The track 232 is preferably removably mounted to a core 210 of the cable assembly 200. In the example shown, a space 222 such as an axial space is provided between each of the connection units 220 disposed along the track 232. The tracks 232 include a top side 204 and a bottom side 206. The top side 204 of the tracks 232 include the connection units 220 and the bottom side 206 of the track 232 can include an adhesive or other material which allows for the track 232 to be removably connected to the core 210.

In this particular example, the bodies of the connection units 220 are fiber optic connectors. In one example, the bodies of the connection units 220 are 12F (fiber) fiber optic connectors. In such an example, twelve optical fibers 212 from the core 210 are terminated within each of the connection unit bodies. In some implementations, the body of the connection unit 220 include sufficient structure to enable mounting of the connection unit 220 at a port or to another connection unit 220. For example, the connection unit 220 may include part of a latching structure. In other implementations, a connection unit 220 lacks structure to attach the connection unit 220 to a port.

Figure 3:
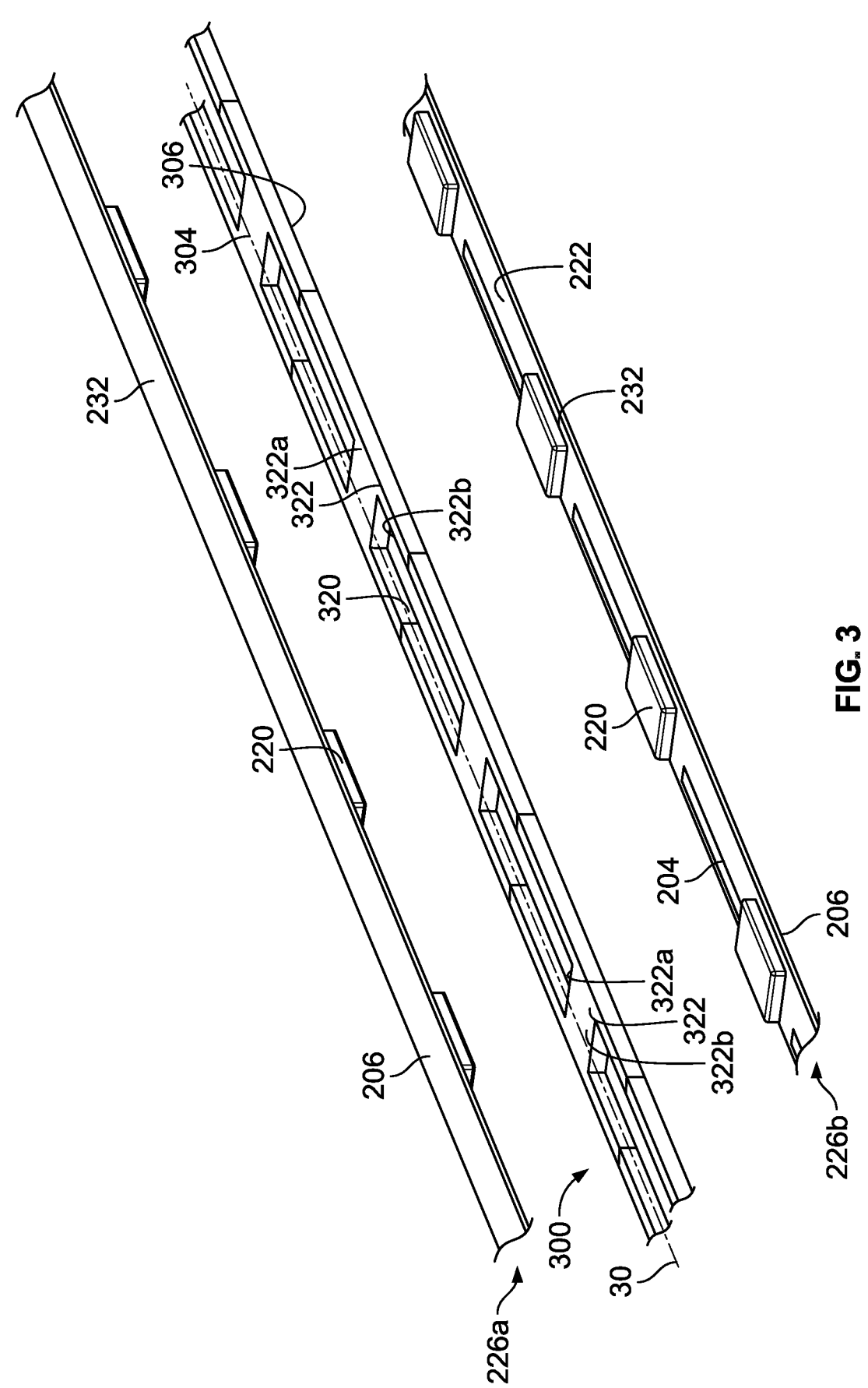
FIG. 3 is the track of FIG. 2 aligned with an adapter and another track.

Referring now to FIG. 3, an adapter assembly 300 is shown. The adapter assembly 300 includes a top side 304 and a bottom side 306. The adapter assembly 300 includes a body 322 defining one or more openings 320. In certain implementations, the body 322 defines a plurality of openings 320 axially spaced from one another along an adapter axis 30. Each opening 320 is configured to receive and align two opposing connection units 220. For example, each opening 320 is sized to receive two connection unit bodies disposed end-to-end with fiber end faces facing each other.

FIG. 3 additionally shows a first connectorization assembly 226a and a second connectorization assembly 226b similar to the connectorization assembly 226 described above. The first connectorization assembly 226a is shown with the connection units 220 facing the top side 304 of the adapter assembly 300. The second connectorization assembly 226b is shown aligned with the openings 320 on the bottom side 306 of the adapter assembly 300. When disposed at the adapter assembly 300, the connection unit 220 are paired with each other within respective openings 320.

In order to create mechanical and optical couplings between the connection units 220, the connection units 220 of the first connectorization assembly 226a are inserted into the plurality of openings 320 on the top side 304 of the adapter assembly 300 while the connection units 220 of the second connectorization assembly 226b are inserted into the openings 320 on the bottom side 306. According, when connected, a connection unit 220 of the first connectorization assembly 226a extends into a first end of a first opening 320 from the top 304 and a connection unit 220 of the second connectorization assembly 226b extends into a second end of the first opening 320 from the bottom 306 so that the connection units 220 face each other to align the corresponding optical fibers.

Figure 4:
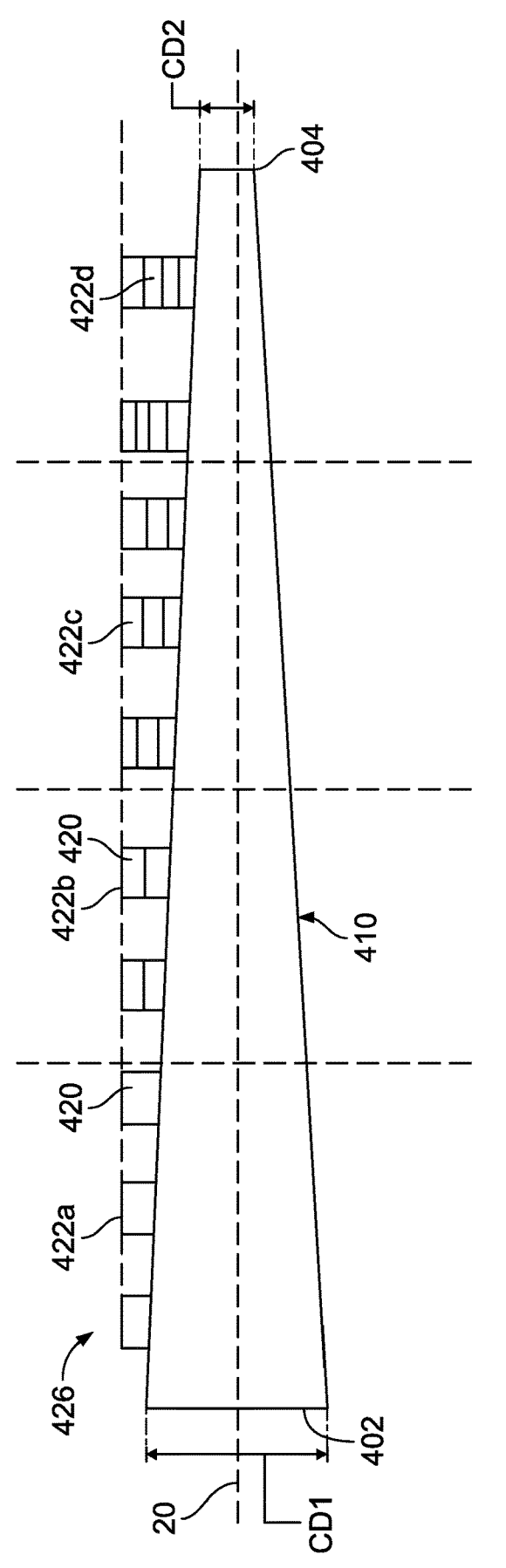
FIG. 4 is a schematic diagram of a different cable assembly in accordance with the principles of this disclosure with a plurality of connection units grouped in stacks.

Referring now to FIG. 4, a schematic diagram of a different embodiment of a cable assembly 400 in accordance with the principles of the present disclosure is shown. In this particular embodiment, a tapered portion of a core 410 of the cable assembly 400 has a first cross-dimension CD1 at a first end 402 that is greater than a second cross-dimension CD2 at a second end 404. The cross-dimension of the core 410 gradually decreases as the cable extends from the first end 402 to the second end 406. In one aspect, the cross-dimension CD1, CD2 of the core 410 is directly related to the number of optical fibers within the core 410. As the optical fibers separate from the core 410 and are terminated within connection unit bodies 420, the cross-dimension of the core 410 decreases. Because the cross-dimension CD1 of the core 410 is greater at the first end 402, there is less space for connection units 420 at the first end 402. It will be appreciated that a main length of the cable core 410 extends a distance from the first end 402 towards the second end 404 with a constant cross-dimension before the cross-dimension of the core begins to decrease. The main length of the cable core 410 can be jacketed. In certain examples, connector units 420 are not disposed along the main length, but instead are disposed at an end portion of the cable core 410.

In certain implementations, the connectorization arrangement 426 can include a plurality of connection units 420 which are stacked on one another. In certain examples, a plurality of such stacks 422 may be spaced axially along the cable axis 20. To optimize space, the size of the stacks 422 of connection units 420 are inversely related to the cross-dimension CD1, CD2 of the core 410 and therefore the amount of optical fibers within the core 410 at the position of the stack 422. In certain examples, the size of the core 410 gradually decreases as it extends towards the second end 404, the size of the stacks 422 gradually increases as the core 410 extends towards the second end 404. In the example shown in FIG. 4, four different groups of stacks 422a, 422b, 422c, 422d are shown. The stacks 422a, 422b, 422c, 422d vary in size depending on the location of the stack relative to the core 410. Other arrangements can also be used.

As can be seen in the diagram, the first connection units 420 disposed at a portion of the cable having the first cross-dimension CD1 are unstacked. As the core 410 continues to extend towards the second end 404, as discussed above, the bodies of the connection units 420 can be stacked together. Further, the number of connection units 420 within each stack increases as the cable extends towards the second end 404. In the example shown, each of the stacks 422 in the second group 422b include two connection units 420, each of the stacks in the third group 422c includes three connection units 420, and each of the stacks 422 in the fourth group 422d include four connection units 420. Other configurations are possible. For example, although there are four groups of stacks of connection units shown in FIG. 4, the amount of groups, connection units 420 and the amount of connection units in the stacks 422 can increase to any amount depending on the amount of optical fibers within the core, the size of the connection unit, and the amount of space to be utilized.

In certain implementations, the bodies of the connection units 420 can be stacked by using various integrated stacking features. In some examples, the bodies of the connection units 420 have magnets. In some examples the bodies of the connection units 420 have keying features which mate with one another. In still other examples, the bodies of the connector units 420 have bumps which mate with one another. It is preferred that the connection units 420 are organized as they are stacked. Various organization features can be integrated into the design of the stacking features. Examples of stacking and organization features are provided in U.S. Provisional Application No. 63/107,888, filed Oct. 30, 2020, the disclosure of which is hereby incorporated hereby by reference in its entirety.

Figure 5:
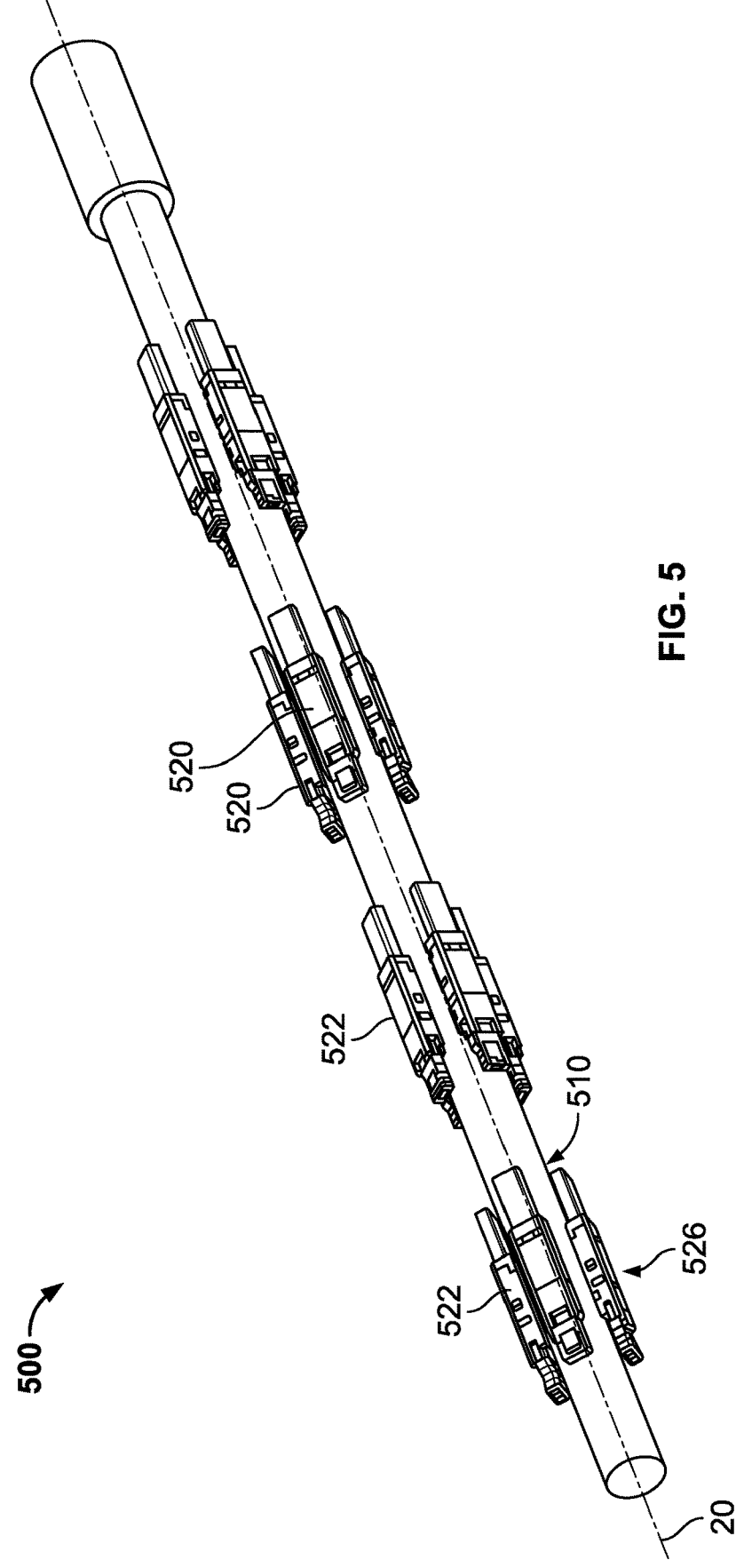
FIG. 5 is a different cable assembly in accordance with the principles of this disclosure with a plurality of connection units, the connection units are in groups which are axially spaced from one another, the connection units in the groups are circumferentially spaced from one another.

Referring now to FIG. 5, another embodiment of a cable assembly 500 in accordance with the principles of the present disclosure is shown. The cable assembly 500 includes a connectorization assembly 526 which includes groups 522 of connection units 520. In certain examples, the connection units 520 are substantially the same as the connection units 120, 220, 320, 420 discussed above. The groups 522 of connection units 520 are axially spaced from one another along the cable axis 20. In each of the groups 522, the connection units are circumferentially spaced about the core 510. Each of the groups 522, in this exemplary embodiment, include four connection units 520.

Figure 6:
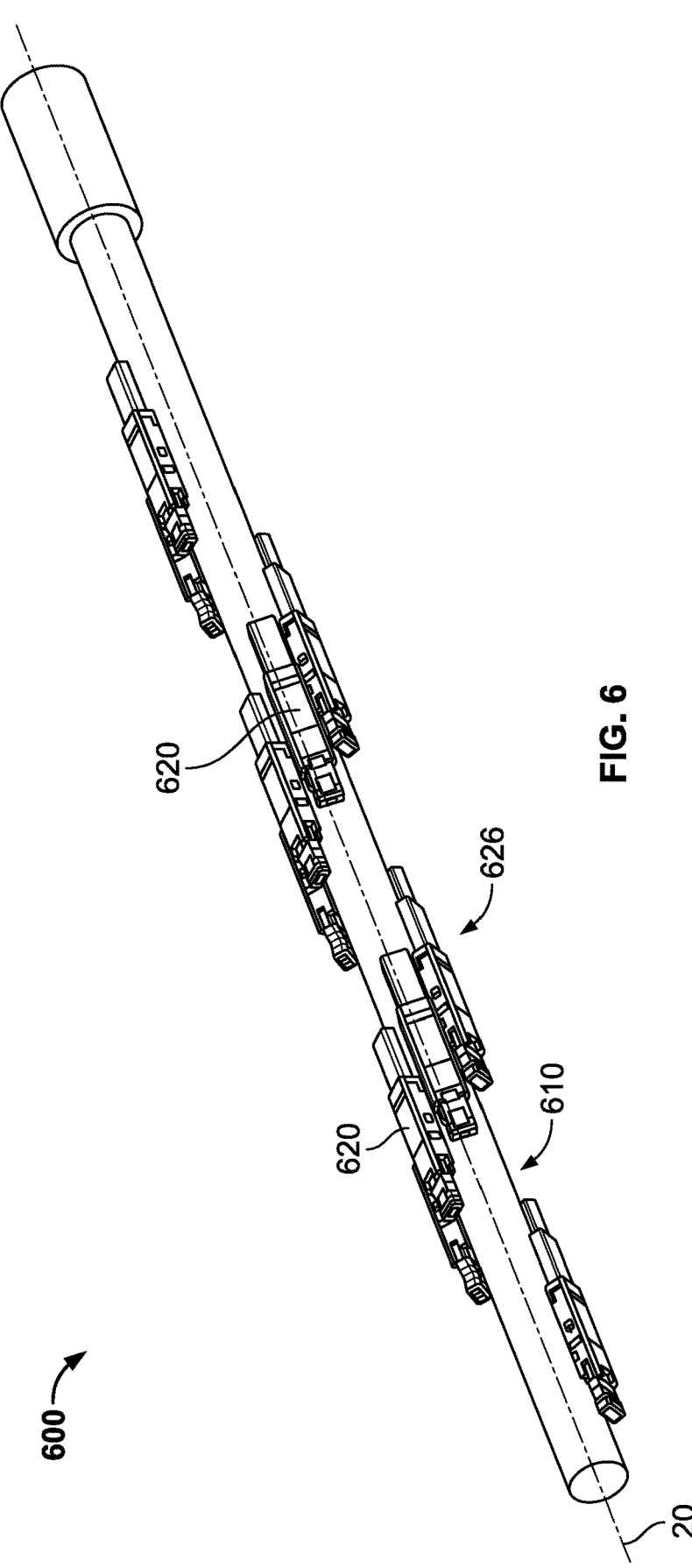
FIG. 6 is a different cable assembly in accordance with the principles of this disclosure, the cable assembly includes a plurality of connection units helically spaced about the cable.

FIG. 6, shows an embodiment of a cable assembly 600 in accordance with the principles of the present disclosure having a connectorization assembly including connection units 620 which are helically spaced about a cable core 610. This means that the connection units 620 are axially spaced along the cable axis 20 and circumferentially spaced about the core 610 simultaneously creating a staggering effect so as to save space without placing the connection units 620 in groups. In certain examples, the connection units 620 are substantially the same as the connection units 120, 220, 320, 420, 520 discussed above.

In some examples, as discussed above and shown in FIGS. 2 and 3, the connection units 120, 220, 420, 520, 620 are fiber optic connectors. However, in other examples, the connection units 120, 220, 420, 520, 620 only make up a portion of a fiber optic connector to save space.

Figure 8:
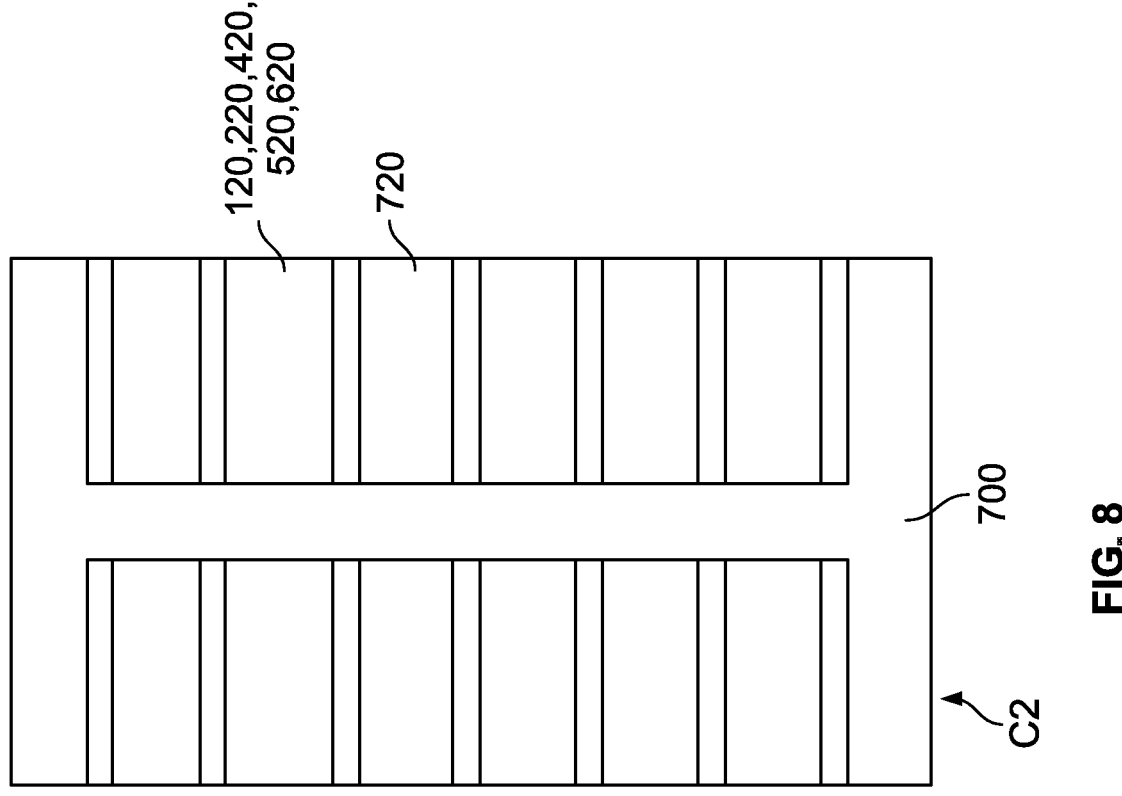
FIG. 8 is a schematic view of a shell in accordance with the principles of this disclosure with a plurality of connection units configured to fit within the shell.
Figure 7:
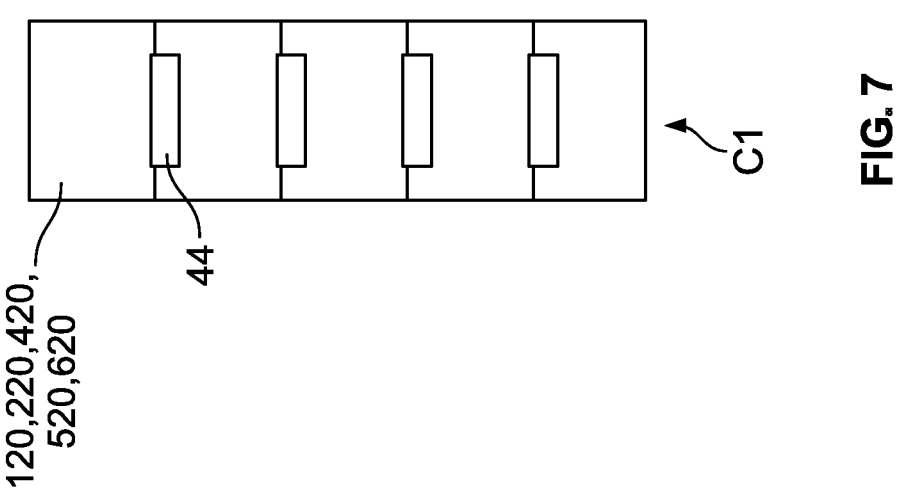
FIG. 7 is a schematic view of a plurality of connection units configured in a stack.

Referring to FIGS. 7 and 8, examples of how the connection units 120, 220, 420, 520, 620 can be put together to form fiber optic connectors or larger fiber optic connectors (if the connection units 120, 220, 420, 520, 620 already are fiber optic connector). Bodies of the connection units 120, 220, 420, 520, 620 are stacked or otherwise arranged within a shell.

FIG. 7 shows an embodiment featuring a plurality of connection units 120, 220, 420, 520, 620 stacked on one another forming a connector C1. The connection units 120, 220, 420, 520, 620 can stacked similarly to how the connection units 420 are stacked in the embodiment shown in FIG. 4 (e.g., bumps, magnets, keying features etc.) The connection units 120, 220, 420, 520, 620 include a stacking feature 44 which allows the connection units 120, 220, 420, 520, 620 to mate with one another so that end faces of the connection units 120, 220, 420, 520, 620 face in a common direction. In some examples, each connection unit 120, 220, 420, 520, 620 has twelve optical fibers and twelve connection units are stacked together. Two of the stacks of connection units can be mated together via an intermediate adapter to provide 144 optical connections between 288 optical fibers. Other fiber counts can be provide as well.

In other examples, as shown in FIG. 8, the connection units 120, 220, 420, 520, 620 can be configured to mount within a shell 700 to form a connector C2. The shell is configured to have a plurality of connection unit housings 720. The connection units 120, 220, 420, 520, 620 can be configured to snap and remain in place within the connection unit housings 720 of the shell 700. In certain examples, the connection units 120, 220, 420, 520, 620 snap in with ramp shaped latches, springs, or other connection means. Once the connection units 120, 220, 420, 520, 620 are disposed within the connection unit housings 720 of the shell 700, the shell 700 can act as a larger connector than any of the individual bodies of the connection units. In the embodiment shown in FIG. 8, there is a first group of connection unit bodies and a second group of connection unit bodies next to one another. Each group has six connection unit bodies allowing for twelve connection units to be placed within the shell 700. The shell 700 can then be mated with a different shell 700 within an adapter creating a fiber optic connection between two groups of connection units which are mounted within the shell 700.

In the examples discussed above, the connection units 120, 220, 420, 520, 620 forming a common fiber optic connector are preferred to have the same length of optical fiber extending from the cable core. In some preferred examples, there is an optical fiber storage unit below each of the connection units 120, 220, 420, 520, 620 allowing for optical fiber to be wound and stored. The optical fiber which is stored is a predetermined amount of slack of the optical fibers allows a user to unwind the optical fiber and a make each of the connection units 120, 220, 420, 520, 620 the same length when stacked or mounted within the shell.

Figure 9:
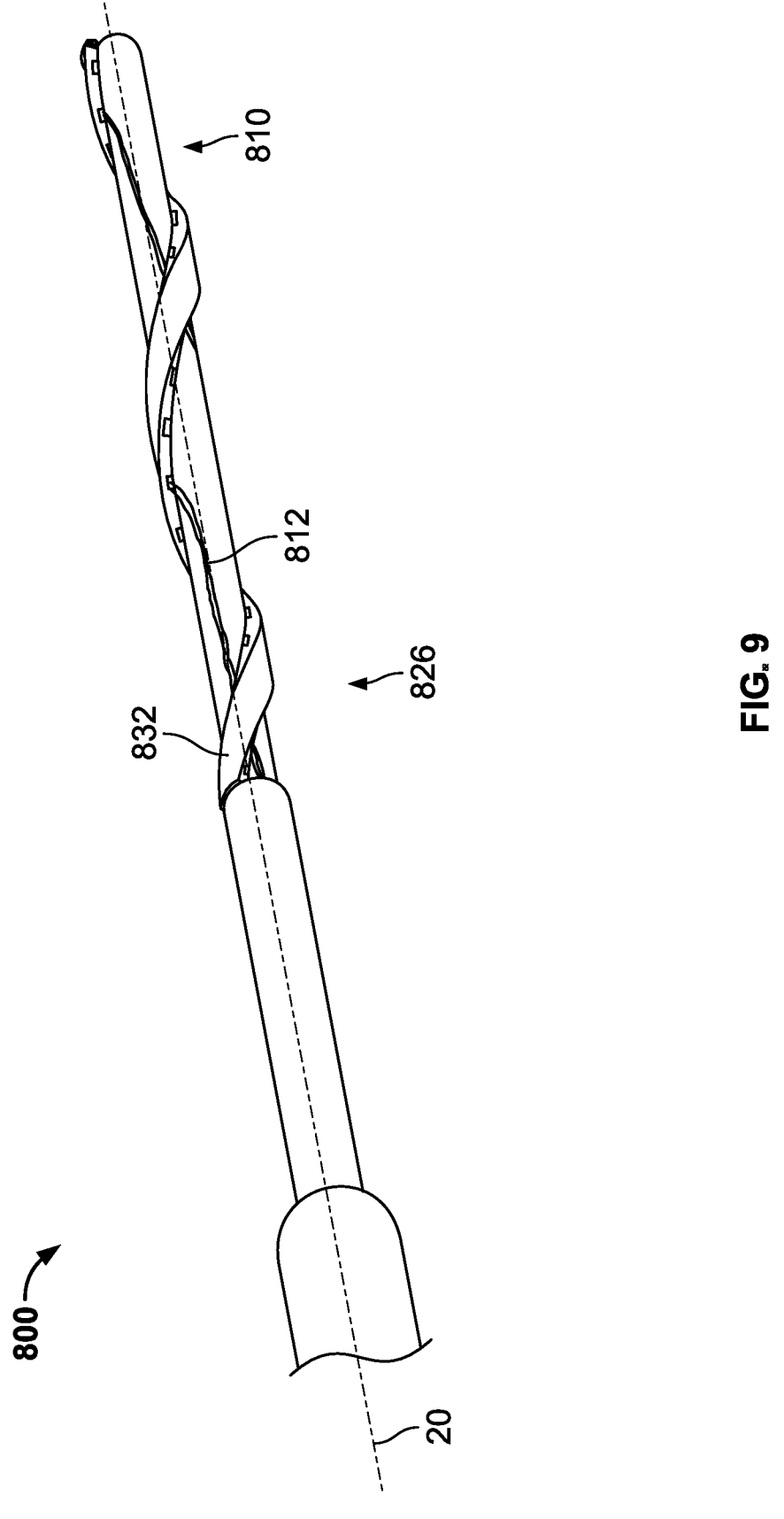
FIG. 9 is a cable assembly in accordance with the principles of this disclosure with a flexible track for mounting the connection units about a core of the cable assembly.
Figure 10:
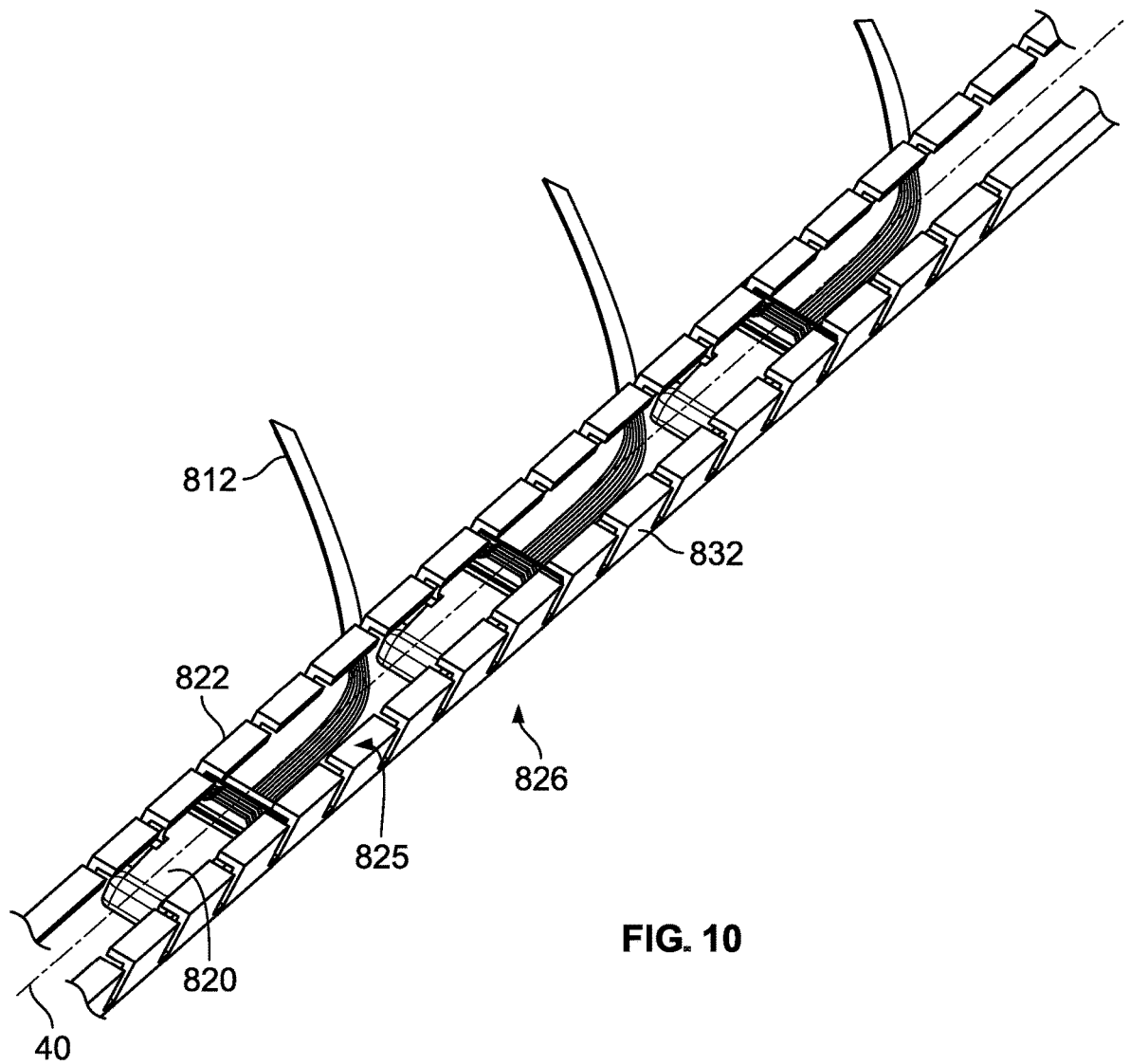
FIG. 10 is a view of the flexible track of FIG. 9 shown in isolation.

Referring to FIG. 9, a different embodiment of a cable assembly 800 in accordance with the principles of the present disclosure is shown. The cable assembly 800 includes a flexible track 832. The flexible track 832 is made from a flexible material which is wrapped helically around a fiber optic cable core 810 including a plurality of optical fibers 812. Optical fibers 812 are shown extending from the core 810 into the flexible track 832. FIG. 10 shows a view of the flexible track 832 from the side that faces the core 810 showing connection units 820 mounted in the track 832. The connection units 820 can be mounted in lines parallel with the track axis or perpendicular to the track axis 40. In certain examples, the fibers of the connection units 820 extend into the track 832 through an elongate side of the track 832 and then run along a channel defined by the track 832. In certain implementations, the track axis 40 extends parallel to the cable. In other implementations, the track axis 40 is angled relative to the cable axis (e.g., the track 832 wraps helically about the core). In certain implementations, the track 832 may be laid in a straight line when the track 832 is removed from the cable core. In some examples, the connection units 820 can be removed from the flexible tracks 832 and stacked or mounted within a shell as discussed above. In other examples, the flexible track 832 can be removed from the core 810 and straightened. The connectorization assembly

826 can be configured to include spacing 822 between each of the connection units 820 which corresponds with the spacing of an adapter similar to the adapter 300 shown in FIG. 3.

Figures 11, 12:
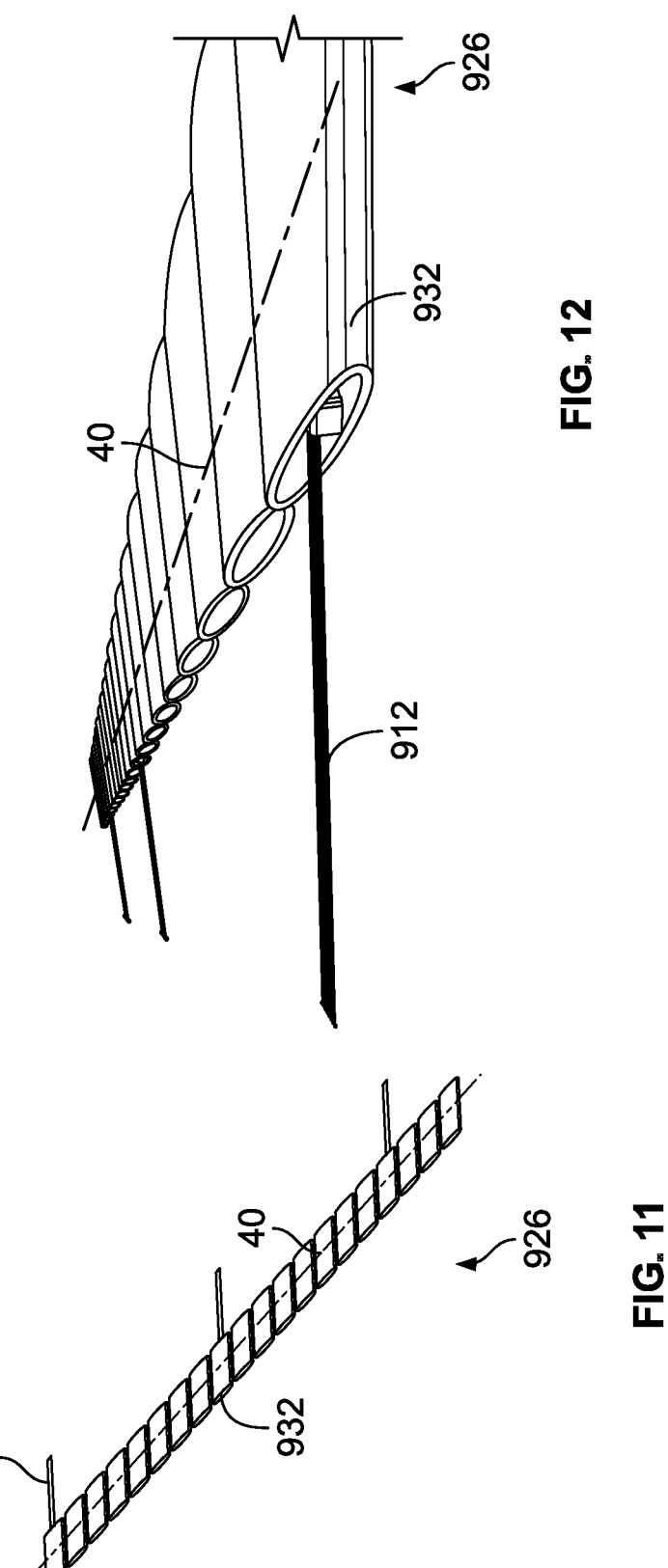
FIG. 11 is a view of a different flexible track with a plurality of connection units.
FIG. 12 is a different view of the flexible track of FIG. 11.

Referring to FIGS. 11 and 12, a different connectorization arrangement 926 featuring a different flexible track 932 is shown. The flexible track 932 is made from a top and a bottom piece of a fabric material. The flexible material includes openings adapted to fit connection units 920. The openings are disposed perpendicular to the track axis 40. The flexible track 932 can be mounted to the cable core so that the flexible track 932 extends parallel with the cable core or wraps (e.g., helically) around the cable core.

Figure 13:
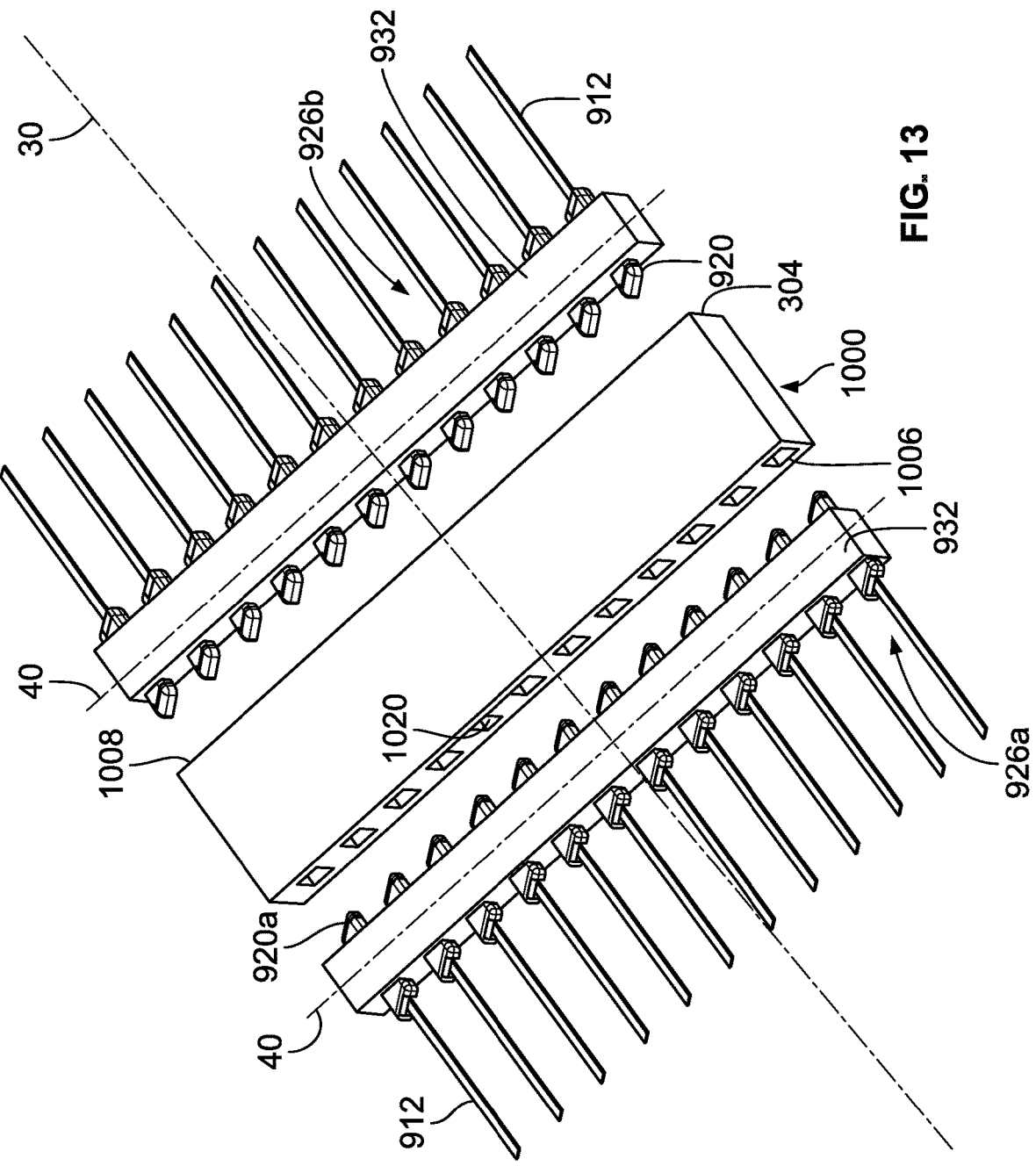
FIG. 13 is the track of FIGS. 10 and 11 aligned with an adapter and another track.

FIG. 13, shows an example adapter 1000 suitable for use with the flexible track 932 of the connectorization unit 926 of FIGS. 11 and 12. The adapter 1000 includes openings 1020 on a first side 1006 and a second side 1008. In this particular embodiment, the openings 1020 open parallel to the adapter axis 30. The openings 1020 of the adapter 1000 are shown in FIG. 13. Additionally shown is a first and a connectorization unit 926a, 926b, similar to the connectorization unit shown in FIGS. 11 and 12. The respective flexible tracks 932 are shown with their respective connection units 920 aligned with the openings of the adapter 1000. The connection units 920 can mount within the openings 1020 and create an optical connection between the connection units 920 of the connectorization arrangements 926a, 926b. In some examples, the connection units 920 may mount within the adapter openings 1020 while still held by the respective flexible track 932. In other examples, the connection units 920 may be removed from the flexible track 932 before mounting within the openings 1020.

Figure 14:
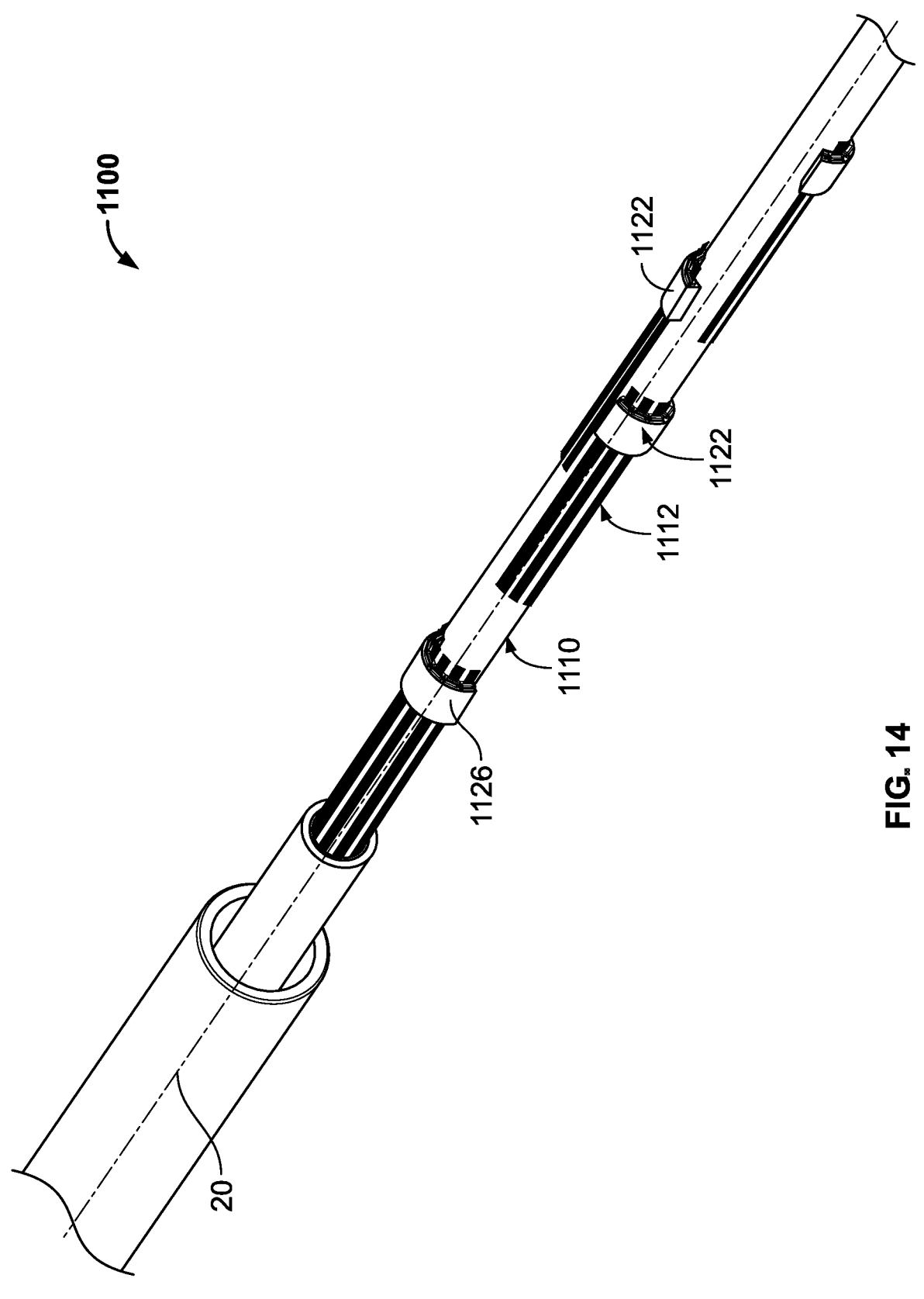
FIG. 14 is a different cable assembly in accordance with the principles of this disclosure.
Figure 15:
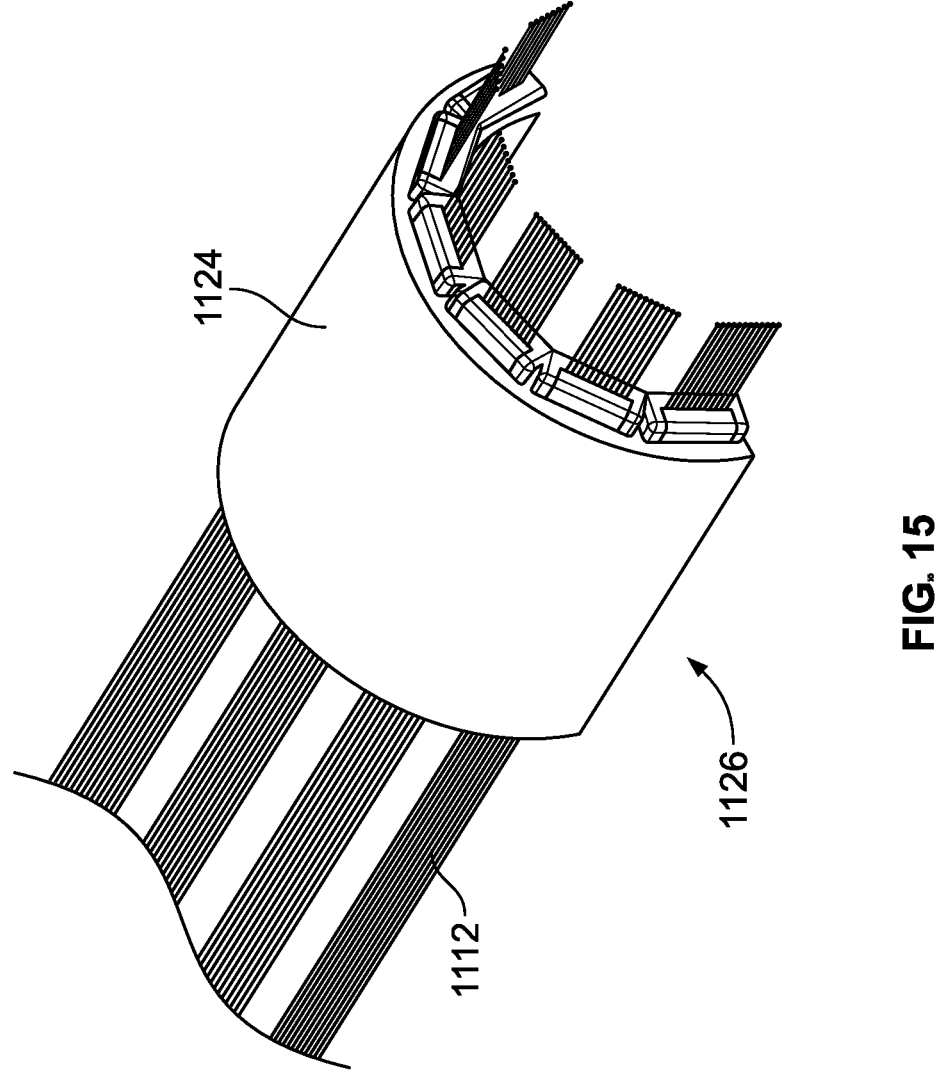
FIG. 15 is a view of a group of connection units from the cable assembly of FIG. 14.

Referring now to FIGS. 14 and 15, yet another embodiment of the cable assembly 1100 is shown. The connectorization assembly 1126 includes a plurality of groups 1122 of connection units 1120. The groups 1122 are managed by a semicircular covering 1124. In certain implementations, the semicircular covering 1124 holds the connection units 1120 in place and allows for the connection units 1120 to remain together in their respective groups 1122. The semicircular covering 1124 can be made from a flexible material or a rigid material depending on the desired use.

Figure 16:
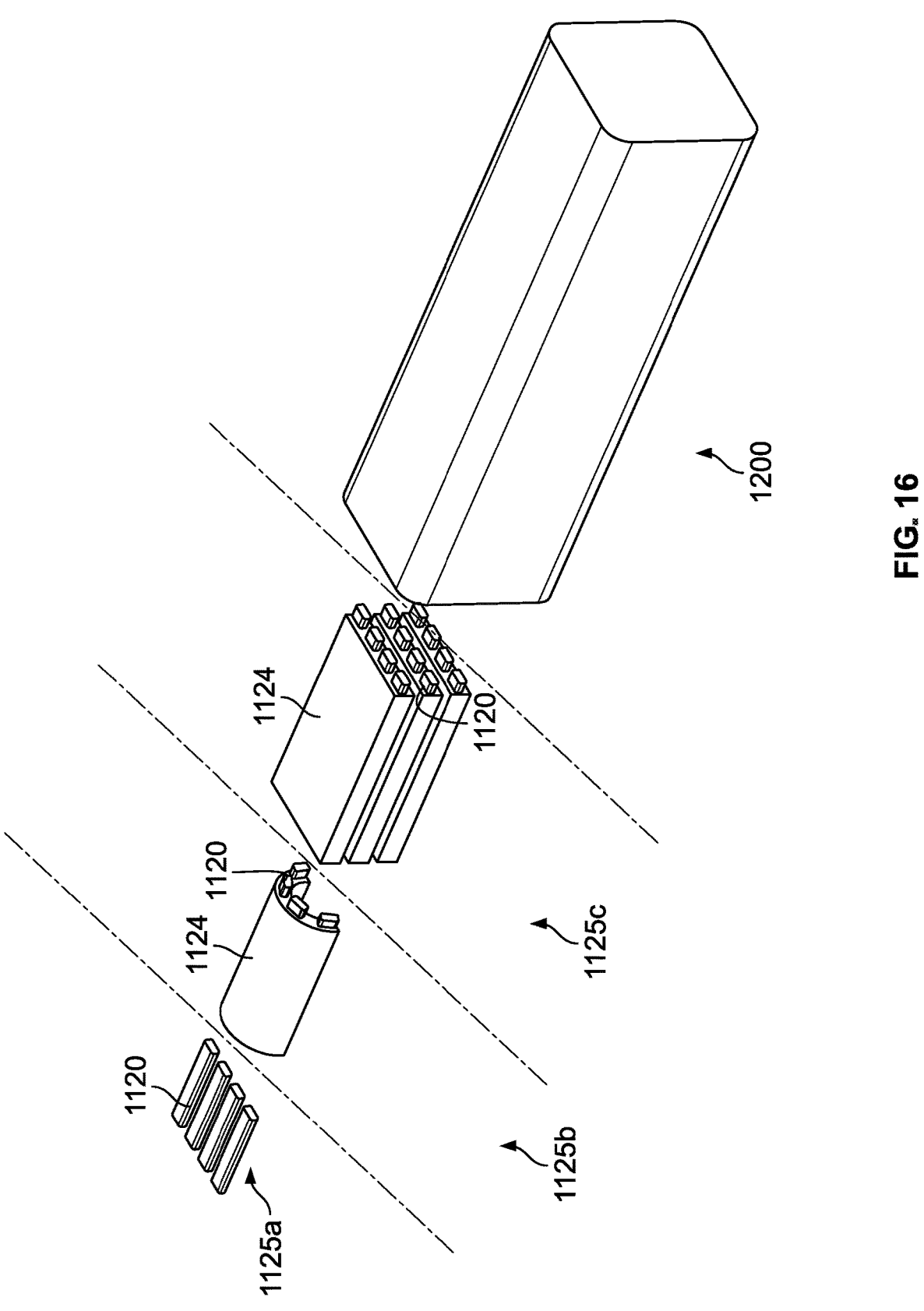
FIG. 16 is a view of an adapter and variations of how the groups of connection units of FIG. 15 can fit within various adapters.

FIG. 16 highlights different ways in which the cables assembly 1100 can be used to mate with an adapter 1200. In particular, three potential ways in which the connection units 1120 can be fit within the adapter 1200 are highlighted. In accordance with the first way 1125a shown, the connection units 1120 are simply removed from the semicircular covering 1124 prior to being inserted into the adapter 1200. In this example the adapter 1200 would include openings which accommodate the connection units 1120 and allow for at least two connection units 1120 to make an optical connection as discussed above. The connection units 1120, in some examples, could be mounted within a shell or stacked on one another as discussed above to form a larger form-factor connector.

The second way 1125b which is highlights shows the semicircular sleeve made with a rigid material. In this example, adapter 1200 would be preferred to have openings which were in a semicircular shape and configured to align with the connection units 1120.

The third way 1125c shows the semicircular covering 1124 made with a flexible material. Accordingly, the covering 1124 can be flattened out prior to mating the connection units 1120 with the adapter 1200. In the example shown, there are three separate semicircular coverings 1124 each with four connection units 1120 stacked on one another in a flattened manner. In this example, the adapter 1200 would need to accommodate the connection units with twelve openings configured to align with the twelve connection units. Although in this particular example there are twelve connection units 1120 per semicircular covering 1124 there can be more or less connection units. There can also be more or less flattened semicircular coverings 1124 per stack.

The adapter 1200 shown is general it is preferred to include features such that the connection units 1120 can be mounted within the adapter and mate with other similarly configured connection units 1120.

Figure 17:
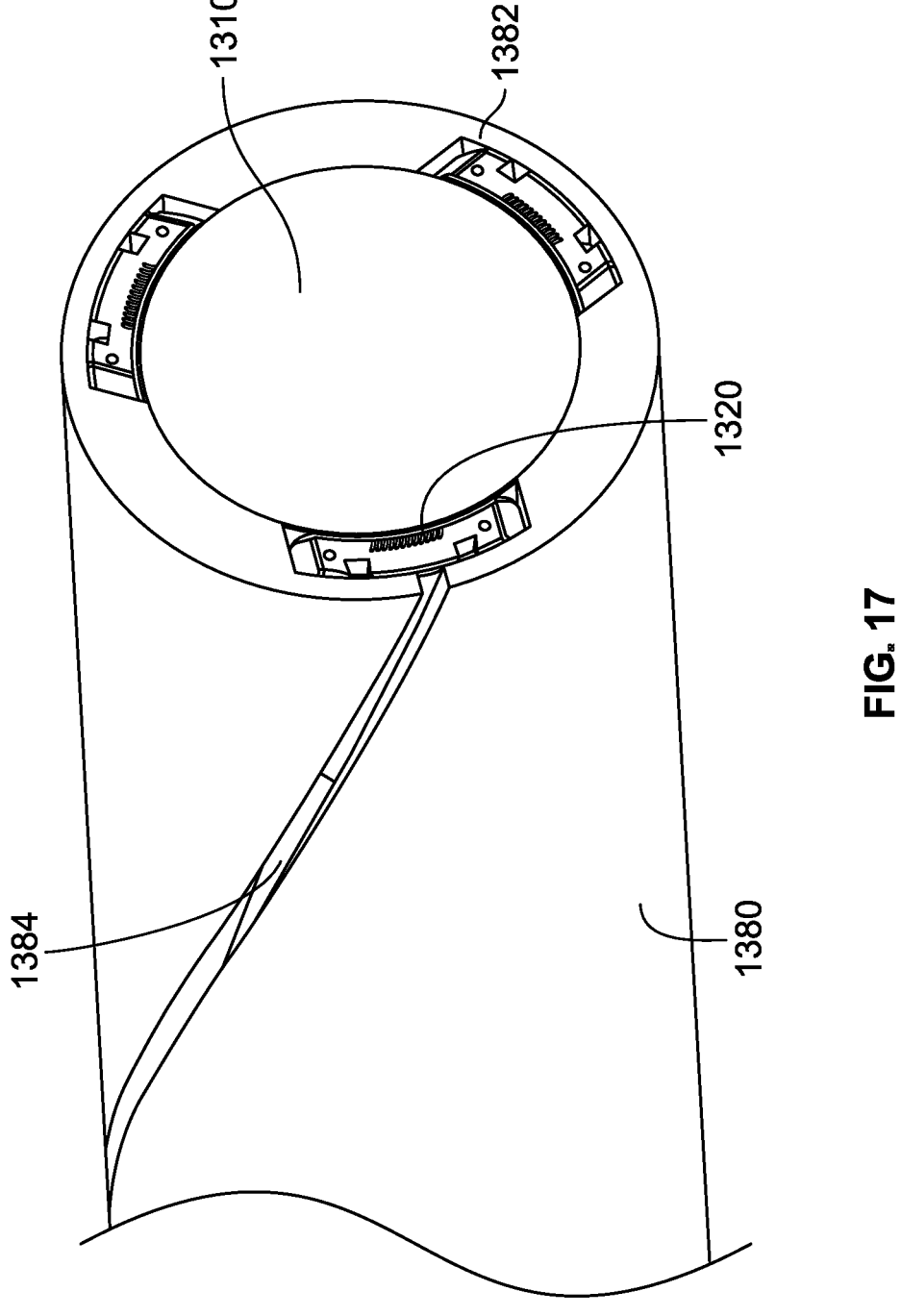
FIG. 17 is a view of a cable assembly with a core, a plurality of connection units, and a protective jacket configured to protect the connection units and the core the cable assembly.
Figure 18:
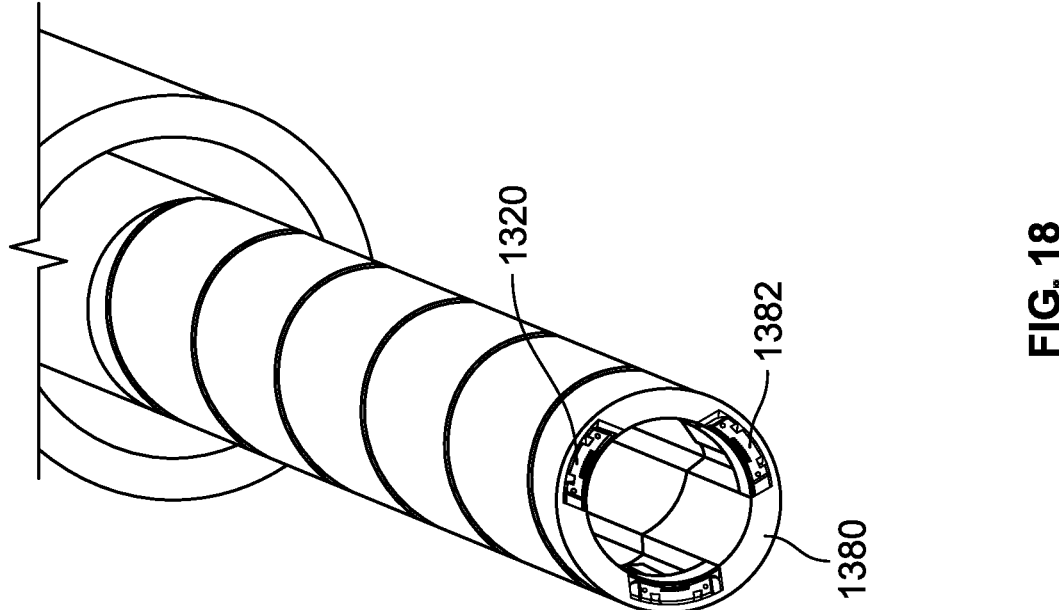
FIG. 18 is a view of the protective jacket of FIG. 17 with the core removed.
Figure 19:
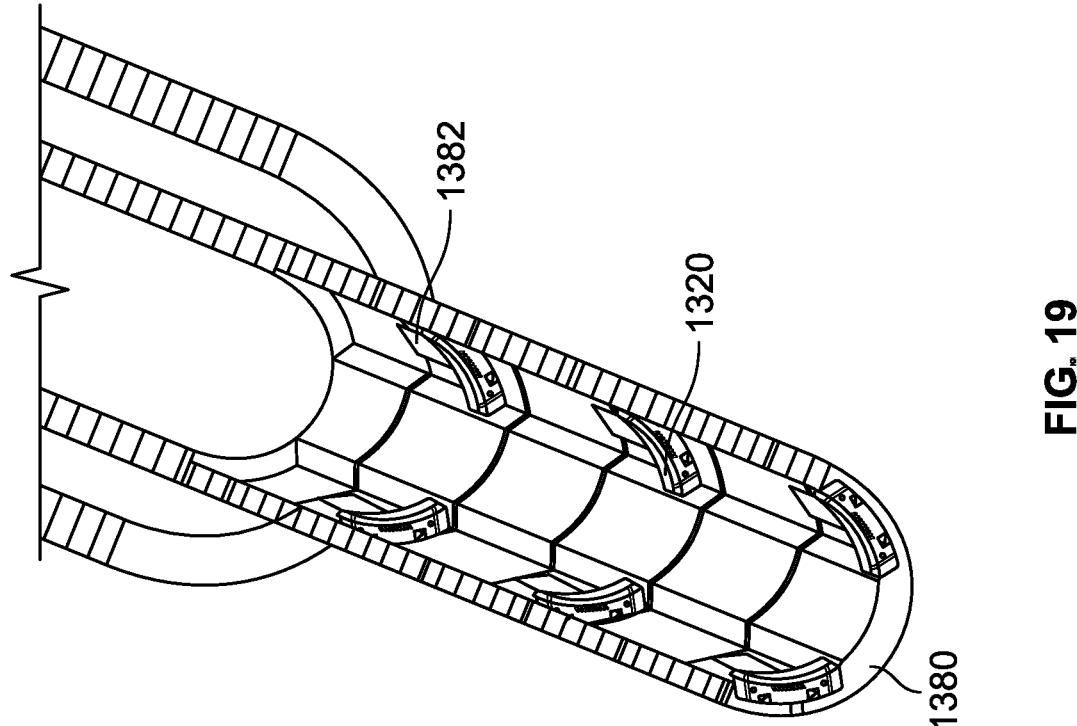
FIG. 19 is a cross-sectional view of the protective jacket of FIG. 17 with the core removed.

Referring generally to the embodiments discussed throughout this disclosure, the optical fibers and connection units are typically fragile and require protection. FIGS. 17 through 19 show a protective sleeve 1380 which can be wrapper helically about a core 1310 and a plurality of connection units 1320.

The sleeve 1380 is preferably configured to include features to enhance removal so as to not damage the core 1310, connection units 1320, or optical fibers within the core 1310 as it is removed. The sleeve 1380 is preferred to be adhered to the core using an adhesive which is easily pealed and removed. The sleeve 1380 is shown with gaps 1384 (e.g., a continuous helical slot) between itself as the sleeve 1380 helically wraps about the core (the gaps 1384 are most easily seen in FIG. 17). The gaps 1384 provide an area which a user can easily hold to peel the sleeve 1380 away from the core. Additionally, the sleeve 1380 is configured to include spaces 1382 which the connection units can fit into. The spaces 82 are preferably only located in placed where there are connection units so the sleeve 1380 can remain flush with the core 1310 and still cover the connection units 1320. The protective sleeve 1380 can be configured to work with any of the embodiments discussed above.

Referring generally to the embodiments discussed throughout this disclosure, the connection units can, in some cases, connect with a different connection unit thereby creating a fiber optic connection without an intermediate adapter. In the case of the embodiment of FIG. 3, if the connection units 220 were configured such that they did not need an intermediate adapter, the adapter assembly 300 would not be necessary and the connection units 220 of the first connectorization assembly 226*a* would mate directly with the connection units 220 of the second connectorization assembly 226*b*.

ASPECTS OF THE DISCLOSURE

Aspects 1: A cable assembly comprising:
    a cable, the cable extending along a cable axis between a first and a second end, the cable including a core, the core including a plurality of fibers, and
    a connectorization arrangement, the connectorization arrangement including a plurality of connection units removably mounted about the core of the cable, each of the connection units including a group of the plurality of optical fibers which have been terminated within a connector.

Aspect 2: The cable assembly of aspect 1, wherein the connection units are aligned with one another parallel to the cable axis, and are axially spaced from one another.

Aspect 3: The cable assembly of aspect 1 or 2, wherein the core defines a cross-dimension, the cross-dimension of the core decreasing as the cable extends along the cable axis from the first to the second end, the cross-dimension of the core being directly related to the amount of optical fibers within the core.

Aspect 4: The cable assembly of aspect 3, wherein the plurality of optical fibers forming the core decreases from the first end to the second end as the plurality of connection units are mounted about the core.

Aspect 5: The cable assembly of aspect 4, wherein a group of the plurality of connection units are stacked on top of one another creating a stack of connection units, the stack of connection units being axially spaced from one another along the cable axis.

Aspect 6: The cable assembly of aspect 5, wherein the stacks of connection units vary in an amount of connection units which create the stacks of connection units.

Aspect 7: The cable assembly of aspect 6, wherein the amount of connection units which make each stack of connection units is inversely related to the cross-dimension of the cable and the optical fibers within the core.

Aspect 8: The cable assembly of aspect 7, wherein the stack of connection units at the first end of the cable includes one connector and the stack at the second end includes four connection units, and the amount of connection units in each of the stacks increases as the cable extends from the first to the second end.

Aspect 9: The cable assembly of aspect 1, wherein the connection units are in a plurality of axially spaced groups, the axially spaced groups being axially spaced along the cable axis.

Aspect 10: The cable assembly of aspect 9, wherein the plurality of axially spaced groups of connection units are circumferentially spaced about the core.

Aspect 11: The cable assembly of aspect 1, wherein the connection units are mounted helically spaced about the core.

Aspect 12: The cable assembly of aspect 1, further comprising a track, the plurality of connection units being mounted to the track and the track being removably mounted to the core.

Aspect 13: The cable assembly of aspect 12, wherein the track has a top side and a bottom side, the plurality of connectors are mounted to the first side and an adhesive material allowing the track to removably mount to the core is on the second side.

Aspect 14: The cable assembly of aspect 12, wherein the track is a flexible structure is made from a polymeric material.

Aspect 15: The cable assembly of aspect 12, wherein the track is a flexible structure is made from a fabric material.

Aspect 16: The cable assembly of aspect 15, wherein the fabric material includes a top piece and a bottom piece and the spaces are sewn together through the top piece and the bottom piece defining the plurality of spaces.

Aspect 17: The cable assembly as in any one of aspects 13-15, wherein the structure is helically mounted about the core.

Aspect 18: The cable assembly as in any one of aspects 12-15, wherein the track is mounted in an alignment which is parallel with the cable axis.

Aspect 19: The cable assembly of aspect 17, wherein each the connection units are axially spaced along a track axis creating a plurality of spaces between each of the connection units, the plurality of spaces corresponding with a plurality of spaces of a fiber optic adapter, the fiber optic adapter including: a first side, a second side and a plurality of openings, the plurality of openings each corresponding to a connection unit and allowing for one connection to be mounted to the first side and a similar connection unit to be mounted to the second side, allowing for an alignment between the first and the second optical connector and an optical connection between the connection units.

Aspect 20: The cable assembly of aspect 1, further comprising a protective sleeve for protecting and keeping the connection units in place, the protective sleeve is wrapped about the plurality of connection units.

Aspect 21: The cable assembly of aspect 20, wherein the protective sleeve is helically wrapped about the cable, and the protective sleeve wraps around the cable such that there are a plurality of small spaces each time the protective sleeve makes a complete wrap around the cable, the plurality of small spaces allowing for removal of the protective sleeve and access to the connection units.

Aspect 22: The cable assembly of aspect 21, wherein the protective sleeve includes a plurality of cut out sections, each of the cut out sections including enough area for one of the plurality of connection units to fit into such that when the protective sleeve is wrapped about the cable each of the connection units is secured within a corresponding cut out portion.

Aspect 23: The cable assembly of aspect 22, wherein the cut out sections and the corresponding connection units are axially spaced along the cable axis in a plurality of groups which are circumferentially spaced about the core.

Aspect 24: The cable assembly of aspect 23, wherein the cut out sections and the corresponding connection units are helically spaced about the core of the cable.

Aspect 25: The cable assembly of aspect 1, wherein there are 3456 optical fibers within the core and 12 optical fibers in each of the connection units.

Aspect 26: The cable assembly of aspect 1, wherein the plurality of connection units include features to stack at least two of the connection units on top of one another to form a larger connector.

Aspect 27: The cable assembly of aspect 26, wherein the larger connector corresponds with a fiber optic adapter, the fiber optic adapter having a first end and a second end, the first end allowing for the larger connector from the cable and the second end allowing for a different larger connector from a different connector of the same size allowing for an optical connection between the two connection units.

Aspect 28: The cable assembly of aspect 1, wherein the plurality of connection units include features to fit at least two of the connection units into a shell in order to create a larger connector Aspect 29: The cable assembly of aspect 28, wherein the larger connector corresponds with a fiber optic adapter, the fiber optic adapter having a first end and a second end, the first end allowing for the larger connector from the cable and the second end allowing for a different connector of the same size allowing for an optical connection between the two connectors.

From the forgoing detailed description, it will be evident that modifications and variations can be made without departing from the spirit and scope of the disclosure.

What is claimed is:

1. A fiber optic cable assembly comprising:
a cable, the cable including a core, the core including a plurality of optical fibers; and a plurality of connection units, each of the connection units including a subset of the plurality of the optical fibers, the connection units being initially in a first configuration spread about the core of the cable as the cable is deployed, once the cable is deployed the connection units being configured to assemble into a second configuration with one another to form a connector, wherein, in the first configuration, the connection units are grouped together in stacks that are spaced along the cable during deployment of the cable.

2. The fiber optic cable assembly of claim 1, further comprising, in the second configuration, a shell which the connection units are configured to assemble within to form the connector.

3. The fiber optic cable assembly of claim 1, wherein the connection units further comprise keying features, the keying features allowing the connection units to assemble with one another to form the connector.

4. The fiber optic cable assembly of claim 1, wherein, in the first configuration, the connection units are protected within a sleeve during deployment, the sleeve extending along the cable.

5. The fiber optic cable assembly of claim 1, wherein each connection unit includes a connection unit body holding the subset of the plurality of optical fibers of the connection unit.

6. The fiber optic cable assembly of claim 5, wherein, in the first configuration, the connection unit bodies of adjacent connection units are spaced from each other.

7. The fiber optic cable assembly of claim 1, wherein the stacks increase in height as the core decreases in cross-dimension.

8. A fiber optic cable assembly comprising:
a cable, the cable including a core, the core including a plurality of optical fibers; and
a plurality of connection units, each of the connection units including a subset of the plurality of the optical fibers, the connection units being initially in a first configuration spread about the core of the cable as the cable is deployed, once the cable is deployed the connection units being configured to assemble into a second configuration with one another to form a connector, and
wherein each connection unit includes a connection unit body holding the subset of the plurality of optical fibers of the connection unit and wherein, in the first configuration, the connection unit bodies of multiple connection units are stacked together as a unit during deployment of the cable.

9. A fiber optic cable assembly comprising:
a cable, the cable including a core, the core including a plurality of optical fibers; and
a plurality of connection units, each of the connection units including a subset of the plurality of the optical fibers, the connection units being initially in a first configuration spread about the core of the cable as the cable is deployed, once the cable is deployed the connection units being configured to assemble into a second configuration with one another to form a connector,
wherein each connection unit includes a connection unit body holding the subset of the plurality of optical fibers of the connection unit and wherein, in the first configuration, the connection unit bodies of multiple connection units are stacked together as a unit during deployment of the cable, and wherein, in the first configuration, the connection unit bodies are managed within a track mounted to the cable.

10. The fiber optic cable assembly of claim 9, wherein the track extends parallel with the cable.

11. The fiber optic cable assembly of claim 9, wherein the track extends helically around the cable.

12. The fiber optic cable assembly of claim 9, wherein each connection unit extends along a longitudinal axis of the track.

13. The fiber optic cable assembly of claim 9, wherein each connection unit is angled relative to the longitudinal axis of the track.

14. The fiber optic cable assembly of claim 9, wherein the plurality of connection units is a first plurality of connection units, the fiber optic cable assembly further comprising:

a second plurality of connection units arranged such that the first and second plurality of connection units are opposing connection units; and an adapter configured to be arranged between the first and second plurality of connection units and mate the opposing connection units while the opposing connection units are still held by respective tracks.

* * * * *